Oct. 17, 1933.    J. W. JONES    1,930,478
AERIAL NAVIGATION INSTRUMENT
Filed May 11, 1931    2 Sheets-Sheet 1

INVENTOR
JUNIUS W. JONES
BY Robert H. Young
ATTORNEY

Oct. 17, 1933.    J. W. JONES    1,930,478
AERIAL NAVIGATION INSTRUMENT
Filed May 11, 1931    2 Sheets-Sheet 2
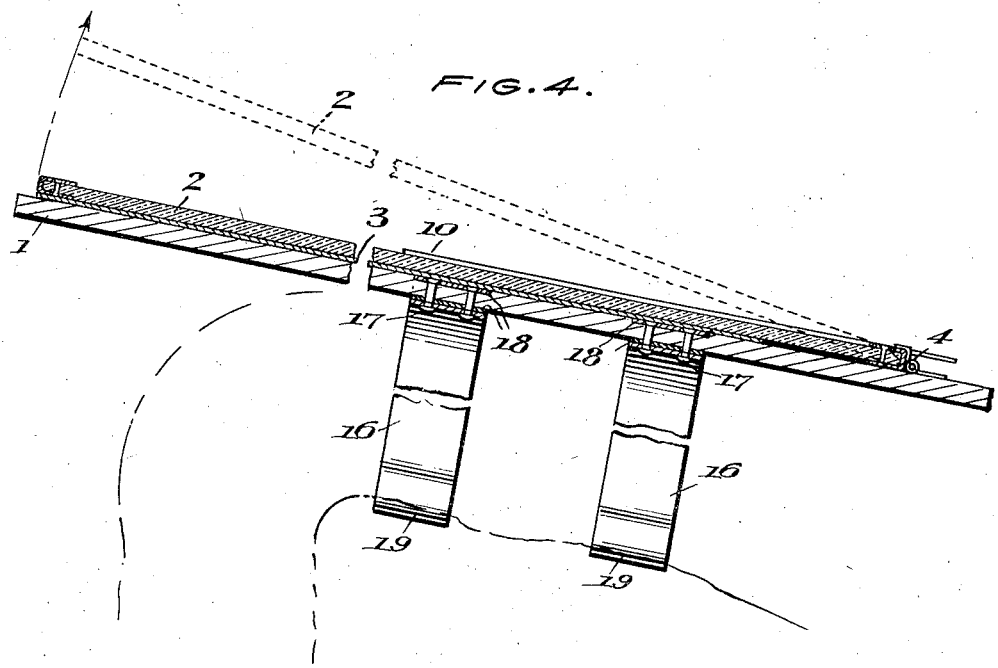
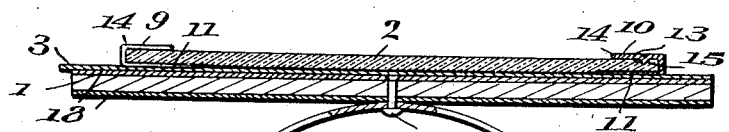
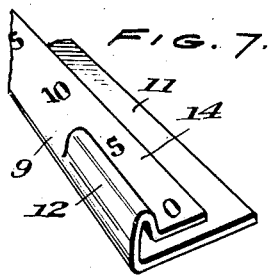
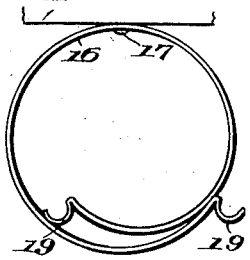
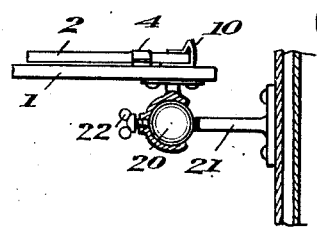
INVENTOR
JUNIUS W. JONES
BY Robert H. Young
ATTORNEY Patented Oct. 17, 1933

1,930,478

UNITED STATES PATENT OFFICE 1,930,478

AERIAL NAVIGATION INSTRUMENT

Junius W. Jones, Washington, D. C.

Application May 11, 1931. Serial No. 536,639

7 Claims. (Cl. 235—61)

(Granted under the act of March 3, 1883, as amended April 30, 1928; 370 O. G. 757).

The invention described herein may be manufactured and used by or for the Government for governmental purposes, without the payment to me of any royalty thereon.

This invention relates generally to aircraft accessories but more particularly to an instrument for use in aerial navigation.

An object of the invention is to provide an aerial navigation instrument by the tentative setting or adjustment of which a pilot is enabled to determine, by a direct reading, at just what time the plane should reach or pass given points in the line of flight over a mapped course, the difference between the estimated and the actual elapsed time of flight between two points serving as a factor for accurately determining the ground speed of the plane as well as the flight time between other points in the course.

A further object of the invention is to provide an aerial navigation instrument of simple and practical design, an essential feature of which is ease and simplicity of operation, and which requires no special knowledge or training for its operation. The device has the additional advantage of being easily operated by one hand and requires but little manual effort on the part of the pilot for the proper manipulation.

In addition to the foregoing, the invention provides novel means for mounting or supporting the instrument so as to afford the maximum accessibility thereto without obstructing or in any way harrassing the movements of the pilot in the cockpit.

Other objects and advantages of the invention will appear from the following description and accompanying drawings, wherein:

Fig. 4 is a longitudinal sectional view of the instrument, on line 4—4 of Fig. 1;

Fig. 5 is a cross sectional view on line 5—5 of Fig. 1;

Fig. 6 is a detail view of one-type of mounting used for supporting the device;

Fig. 7 is a detail view of a portion of the index slides of the instrument, and Fig. 8 is a view of an alternate type of instrument mounting or support.

Figure 1:
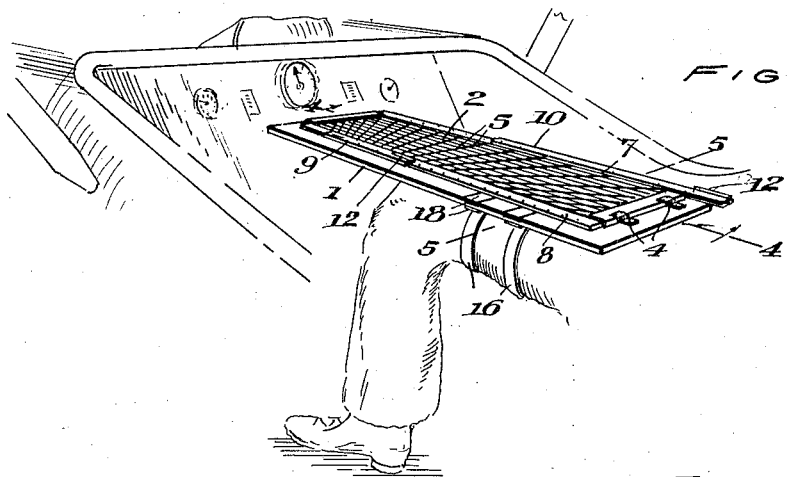
Fig. 1 is a view, in perspective, illustrating the practical application of the invention.

The instrument consists of a base panel 1 and a scale panel 2 between which is inserted an airway map 3. The base 1 may be of wood, metal or other suitable material but the scale panel 2 is formed of material which is transparent, such as glass, celluloid, etc., through which the map is clearly visible. One end of the scale panel is hingedly secured to the base, as at 4, so that it can be readily swung outwardly of the base to facilitate the insertion of the map thereunder.

The surface of the scale panel is marked longitudinally with a plurality of equally spaced straight, parallel lines 5 representing velocities in terms of ground speed, and crosswise with a plurality of evenly spaced radius lines 6 representing units of time. The time-indicating lines cross the ground-speed indicating lines in the manner illustrated and in the scale of measurement shown in the drawings, each time line represents a minute. At intervals of five minutes, the time lines are marked with index characters 0 and 5 alternately and speed index characters, within an appropriate range, are placed adjacent the terminals of the speed lines and also at intermediate points therebetween.

The scale lines are spaced inwardly from the sides of the scale panel to provide margins 7 and 8 along which the index slides 9 and 10 are moved in the setting or resetting of the device to give a reading. Each slide is marked off into five-minute graduations; the left hand slide 9 having sixty graduations indexed from zero to sixty and the right hand slide 10 having seven graduations indexed from thirty to sixty. These slides may each be formed of a plate 11 of spring metal bent upon itself, as shown in Fig. 7, to provide a channel strip of U-shape cross section for straddling the marginal edge of the scale panel; one end of the strip being provided with a fingergrip 12 for conveniently moving or adjusting same to align the graduations thereof with the proper graduations of the scale panel.

Any suitable means may be employed aside from the friction grip of the straddling portions of the strip upon the margin of the panel, for retaining the strip in any position to which adjusted. A convenient means of accomplishing this consists in providing each margin of the panel 2 with a series of longitudinally spaced holes or sockets 13 and in equipping each slide, preferably on the underside of its upper panel-straddling member 14 and adjacent the finger grip 12, with a depending lug or projection 15 adapted to be lodged in one of the holes 13, as seen in Fig. 5, to hold the slide stationary. By pressing the finger grip 12 outwardly, the lug 15 is lifted out of its socket and the slide is free for adjustment to another position.

In Figs. 1 and 4, the instrument is shown as being attached to the person of the pilot. This is preferably done by means of quick-detachable body clamps, such as open spring bands 16 which are secured by fastening elements 17 to the underside of the base panel 1, the latter being reinforced adjacent the clamps by cross strip 18. The spring bands 16 normally tend to contract as shown in Fig. 6 and have finger-grips 19 at each end to facilitate spreading the clamps, preparatory to engaging same about the thigh, in which position they firmly support the instrument in a position convenient to the pilot as illustrated in Fig. 1, while at the same time permitting the quick removal of the device in an emergency. An alternate form of mounting is shown in Fig. 8. In this case, the instrument is connected by a ball-and-socket joint 20, to an inwardly projecting bracket 21 secured to the side of the cockpit. The ball-and-socket joint provides for adjustment of the instrument in any direction and enables the same to be swung back in an out of the way position when not in use. A suitable locking member, such as the thumb-screw 22, is provided for tightening the joint to hold the device in any position of adjustment.

Figure 2:
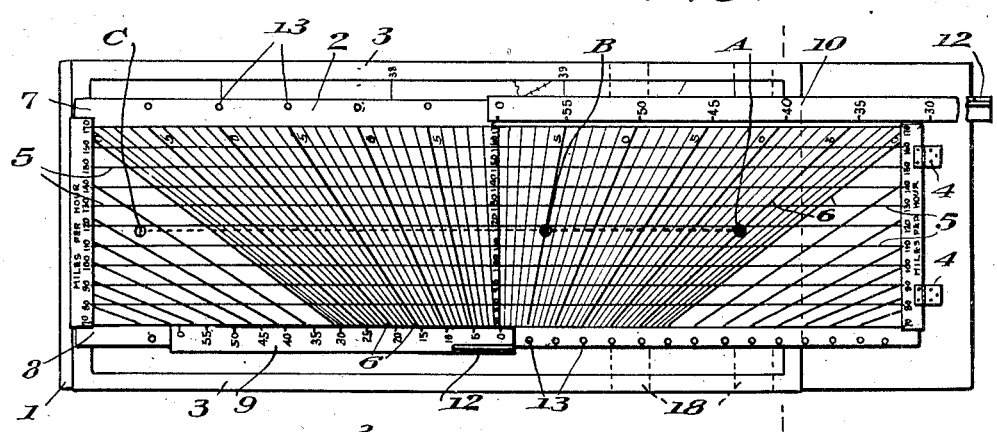
Fig. 2 is a plan view of instrument set for a preliminary reading.

In preparing the instrument for use on a contemplated flight, the proper airway map, having the flight course indicated thereon in dotted lines, is inserted between the panels with the dotted flight line parallel to the ground speed lines 5 of the scale panel 2. Assuming that the circle A at the right hand terminal of the heavy dotted line, in Figs. 2 and 3 respectively, indicates the starting point of the flight and that the starting time is thirty-five minutes past the hour or for example, 10:35 A. M. or P. M., the map is shifted manually until the starting point is located at the intersection of one of the time lines 6 and a ground speed line 5 corresponding to the estimated speed of the plane, such as 120 M. P. H. The index slide 10 is then adjusted until the graduation 35 registers with the time line on which the starting point is located, as in Fig. 2. The graduation 55 will then be in registry with the time line on which the next circle B indicating another point along the course, is located; thus giving a reading of 20 minutes as the flight time between the points A and B in the course, with a ground speed of 120 M. P. H. This is merely an approximation and the instrument is reset according to the actual elapsed time of flight.

Figure 3:
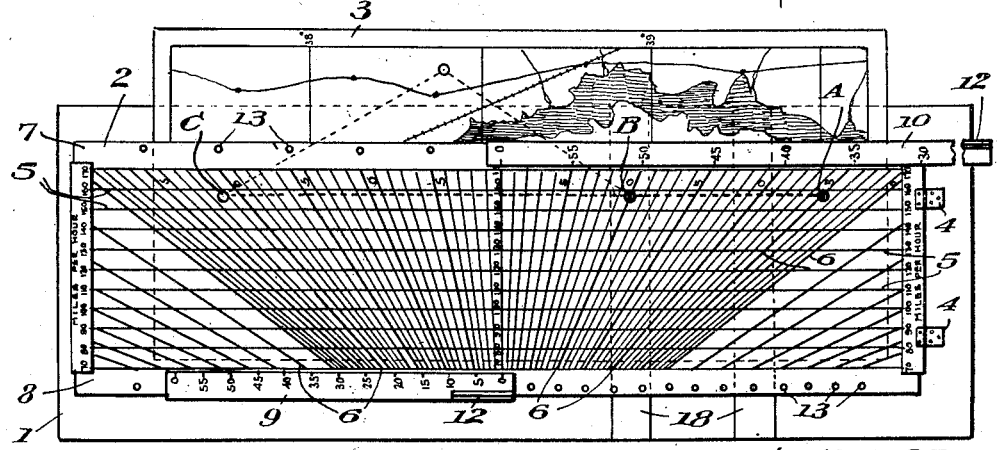
Fig. 3 is a similar view of the instrument adjusted to give a final reading.

Hence when the pilot notes that the plane reaches the point B five minutes earlier than as indicated by the instrument, as for example, 10:50 instead of 10:55; the map is shifted to move the starting point A downwardly along the 35 minute line, keeping the dotted flight line parallel to the speed lines, until the point B is centered on the 50 minute line, at which time the points A and B will be along that speed line representing a ground speed of 160 M. P. H. This reading thus gives the true ground speed and elapsed time of flight between the given points. The slide 9 is next adjusted until its zero graduation is opposite the same time line as the hour graduation or 60 mark of the slide 10, as seen in Fig. 3. From the graduation on the slides 9 and 10 it is at once ascertained that the point C should be reached, at a ground speed of 160 M. P. H. in 47 minutes from A and in 32 minutes from B. When the starting time is 10:35, the plane should arrive at point B at 10:50 and at point C at 11:22. In similar manner, the pilot can readily determine by a direct reading at just what time the plane should arrive at any given points along the course. The instrument may be scaled for a particular map but is adapted for maps of different scales in which case the value of the time lines 6 will vary according to the scale of map associated therewith at any time. For example, in the map shown, the scale may be assumed to be 1/63360 in which one inch represents a mile, as there are 63360 inches to a mile, and each time line represents one minute. If a small scale map, such as 1/253440 wherein one inch equals 4 miles, be substituted, then each time line will represent four minutes and the index figures of the slides shall be disregarded. Thus, with such a scale, the flight time for the distance A to B in Fig. 3 would be read as sixty minutes or one hour from the starting time.

From the foregoing it is apparent that the instrument provides means for conveniently checking up on the ground speed of the plane as well as providing a flight time table for the guidance and convenience of the pilot.

Having thus described the invention, what is claimed is:—

1. In an aerial navigation instrument, a holder for an aerial map having a transparent scale provided with spaced parallel lines representing velocities in terms of ground speed within a given range and radial lines crossing the parallel lines and representing units of time.

2. In an aerial navigation instrument, a holder for an aerial map including a transparent scale beneath which the map is shiftable for obtaining different readings, said scale being marked with straight parallel lines crossed by radial lines, the parallel lines representing different velocities in terms of ground speed and the radial lines representing units of time, and slides on said scale having numbered graduations adapted when positioned opposite the time graduations of the scale to facilitate a reading of the flight time between given points on the map.

3. In an aerial navigation instrument, a holder for an aerial map including a base panel and a transparent scale panel between which the map is freely shiftable longitudinally and crosswise of the holder for obtaining different readings, said scale panel being of smaller crosswise dimensions than the map and movable outwardly of the base panel to facilitate the insertion of the map between the panels.

4. In an aerial navigation instrument, a holder for an aerial map including a base panel and a transparent scale panel between which the map is freely shiftable longitudinally and crosswise of the holder for obtaining different readings, said scale panel being of smaller crosswise dimensions than the map and hinged to the base panel for swinging movement outwardly thereof to facilitate the insertion of the map between the panels.

5. In an aerial navigation instrument, a holder for an aerial map including a transparent scale beneath which the map is shiftable to obtain different readings, said scale having transverse lines connecting graduations indicating units of time and longitudinal lines connecting other graduations indicating ground speed between selected points along a line on the map indicating a desired track, index slides marked with divisions of time corresponding to the time-indicating graduations of the scale, said slides being slidable on marginal edges of the scale panel, and means for retaining the slides in positions of adjustment.

6. In an aerial navigation instrument, a holder for an aerial map including a base panel, a transparent scale panel mounted on the base panel and movable outwardly thereof to permit the insertion of the map between the panels, said scale panel having spaced longitudinally extending parallel lines representing velocities in terms of ground speed and crossed by radius lines representing units of time, slide members marked with division of time corresponding to the line intervals between the marking of the radius lines adjacent the respective scales and slidably mounted on respectively opposite edges of the scale panel, and a handle on each slide.

7. An aerial navigation instrument including a transparent member adapted to be superimposed on a map and having an index formed by a series of straight parallel lines intercepted by a series of relatively divergent lines, the said straight lines representing different velocities per hour and serving as guide lines for lining up selected points on the map along a given course in accordance with the true or estimated velocity and the said crossing lines representing division of time for giving a reading of the flight time between the selected points on the map and serving as directional guides for relatively moving the map and transparent member when shifting the selected points from one velocity line to another.

JUNIUS W. JONES.